Dec. 15, 1959  J. BECKER ET AL  2,917,041
RADIATION APPLICATOR

Filed Aug. 8, 1957  3 Sheets-Sheet 1

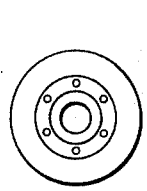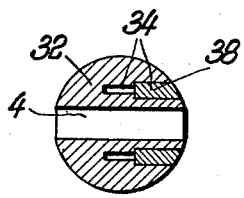
Fig. 9
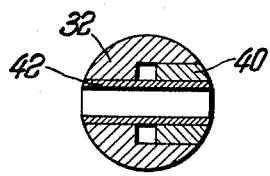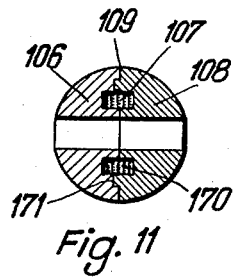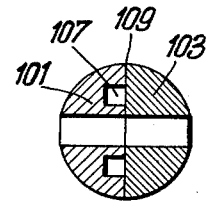
Fig. 10    Fig. 11    Fig. 12
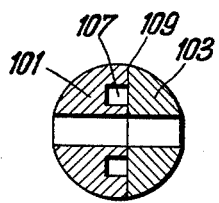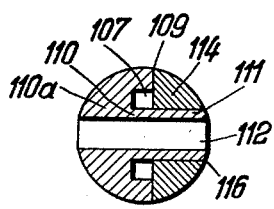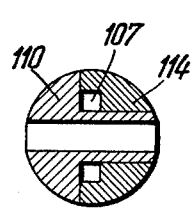
Fig. 13    Fig. 14    Fig. 15

Dec. 15, 1959   J. BECKER ET AL   2,917,041
RADIATION APPLICATOR

Filed Aug. 8, 1957   3 Sheets-Sheet 3

United States Patent Office 2,917,041
Patented Dec. 15, 1959

2,917,041

RADIATION APPLICATOR

Josef Becker and Kurt E. Scheer, Heidelberg, and Hermann Egelhaaf, Braunschweig, Germany, assignors to Buchler & Co., Braunschweig, Germany Application August 8, 1957, Serial No. 677,122

Claims priority, application Germany August 10, 1956

14 Claims. (Cl. 128—1.2)

The invention relates to radioactive beads, useful, for instance, for the treatment of various types of cancer.

It is known to produce such radioactive beads (that is, spheres or balls and also ellipsoids of revolution, cylinders and the like, having a central bore) from radioactive material, such as, for instance, cobalt 60, and thereafter to provide them with an inactive coating. It is also known to prepare such solid beads from inactive cobalt material and thereafter to irradiate them in a pile. Thus, in these cases, practically the whole bead consists of radioactive material having uniform specific activity.

Such articles are on the market under the name of "radio cobalt beads." They have a diameter of about 6 mm. and are, for example, used after a desired number of beads have been strung on a thread, for insertion into cavities in the body so as to apply radiations of any desired dosage to centers of disease at these points.

The inactive coating surrounding the beads may, for example, be applied galvanically and will protect the surface of the bead not only at the external spherical surface, but also at the surface of the bore and will seal off the surface on the outside.

A principal object of the invention is to facilitate and simplify the production of substantially solid radioactive beads having a central bore.

Other objects and advantages will be apparent from a consideration of the specification and claims.

According to the invention, recesses are formed in the solid body of a bead made of non-radioactive material for accommodating the radiator and these recesses are closed after the radiator has been introduced, and are, if necessary, sealed. The said recesses may extend from the periphery of the spherical body or from a sectional plane along which the body is divided, the recesses being disposed at right angles to and/or concentric with the axis.

Various embodiments of the invention are illustrated in the Figures 1–24 of the accompanying drawings, the various figures being axial sections through various forms of construction of spherical radio-active beads.

In Fig. 1 is shown a solid bead comprising a spherical body 2 having a bore 4; the body is provided with an annular recess 6 which is disposed coaxially with the axis of the bore and serves to receive the radiation substance. After the substance has been placed in the groove 6, it is closed by an annular cylindrical part or ring 8 of corresponding dimensions. The circular joints 10, 12 at the surface of the ball can be closed by cementing or soldering. The part 8 may be provided internally or externally with a screw thread and screwed into the groove which is provided with a corresponding thread. It is likewise possible to secure the part 8 in the groove by arranging it to be a press fit.

As is shown in Figure 2, the part 8 may also be made shorter than it is shown in Fig. 1, so that after the part 8 has been inserted, a channel 14 is formed on the spherical surface, which channel can be filled with, for example, tin solder or some other soldering material or with a cement or suitable binder, so as to provide a reliable seal.

As shown in Figs. 3 and 4, the annular cylindrical part or ring 8 itself may be so formed that it can accommodate the radiation substance. Thus, as shown in Fig. 3, an annular groove 14 can be provided in the end face of the ring, or, as shown in Fig. 4, a peripheral groove 18 can be formed.

The part 8 may itself be made of active radiation material, for example of cobalt 60. This form of construction is of importance, particularly in the case of the arrangement shown in Fig. 2, since in this case, as the groove 14 is closed with soldering or cementing material, the active material nowhere reaches to the surface of the ball, but is sealed off with respect thereto.

The space required for accommodating the active substance can also be provided by forming in the body 2 a peripheral groove 20 of, for example, cylindrical shape, which is closed after the active substance has been introduced, as shown in Figure 5. Sealing of the groove can be effected, for instance, by solder, which completes the filling of the groove and completely encloses the radiation substance. It is preferable to take steps to obviate the occlusion of any air, and to achieve this, the soldering operation is expediently carried out in a vacuum. It is also possible to insert a spring or snap ring 22, which is then soldered to the ball along the circular joints 24, 26, at the periphery of the body.

A special form of a sealing device for a ball as shown in Fig. 5 is illustrated in Fig. 6. The two parts 28, 30, shown therein complement one another to form a cylindrical ring, the thickness of which corresponds to the width of the recess 20. After the radioactive substance has been introduced, these parts are inserted in the recess 20 and are thereafter soldered or sealed in some other suitable manner.

In the forms of construction which have been described so far, a single annular space is provided in each case for receiving the radioactive substance. In the case of applicators, in which the radioactive substance consists of short elements or filaments formed, for example, of cobalt 60, it is expedient to provide a separate receiving space for each such element. Applicators having receiving spaces constructed to receive such elements are illustrated in Figs. 7 to 9.

In Fig. 7, the spherical body 32 is provided with recesses 34 arranged on a circle coaxial with the bore of the body. After the elements have been introduced into these recesses 34, the recesses are closed by pins 36, which can again be soldered, cemented, or sealed in any suitable manner at the surface of the ball. As shown in Fig. 9, the individual recesses can also be closed by a single ring 38 for which an annular groove is formed in the body 2 on the same circle as that on which the recesses 34 are formed.

Fig. 8 shows in cross-section and plan view a form of construction in which the receiving recesses 40 for the elements are disposed radially with respect to the bore 4 of the spherical body. Should it prove to be expedient, these recesses could naturally also be arranged in any other desired manner, for instance so that they are all directed towards the center of the ball. Similarly, when the invention is carried into effect, using an annular groove as described with reference to Figs. 1 to 6, it is not limited to forming these annular grooves coaxially, although the arrangements illustrated are probably most suitable. In the case of the construction shown in Figs. 7 to 9, the recesses can also be closed directly by soldering, cementing or the like, i.e. without introducing pins or a ring.

A further method of constructing an applicator according to the invention consists in applying the arrangement illustrated in Fig. 3 for the ring 8 to an applicator as shown in Fig. 9. For example, the individual recesses for receiving the elements may be arranged at the inner end face of the ring 38, which would then be introduced, together with the elements, into the annular groove in the body 2.

In view of the small size of the bead, it may be advantageous from the point of view of manufacture to produce the spherical body having the annular groove, as shown, for example in Figures 1, 2 and 9, from two parts. This is shown in Fig. 10, in which a small bush 42 is pushed into the bore of the body 32 and is then soldered or welded to the remainder of the spherical body. As the bush can be drawn from high-grade material, it is possible to make the wall left in the body between the annular groove 6 and the bore 4 very thin, for example 0.1 mm. thick, and yet provided adequate strength. Such small wall thicknesses could be obtained only with very great difficulty if turned from the solid, quite apart from the fact that the turned part 32 shown in Fig. 10 is also substantially simplified.

In Fig. 11, a bead is shown which consists of two symmetrically formed solid half-spheres 106 and 108, the dividing plane 109 of which is on the mid-plane of the bead. One, or both of the halves, is, or are, provided with a groove 107, which, for instance, is hollowed out by turning. This groove serves to accommodate an element, for example, in the form of a filament 170, of which a length corresponding to the desired activity is cut off and wound in coils to a diameter which corresponds to that of the annular groove 107, so that the filament coils fit into the groove.

The axial alignment of the halves of the ball, when they are assembled, can be assisted by means of a spigot 171 on one-half to fit into a corresponding recess in the other, the spigot and recess being in the region of the dividing plane.

The joininng of the solid halves may also be effected in this case by, for example, tinning the separating surfaces. After the element has been inserted, the halves merely require to be heated and pressed against one another, whereby they are united in a single operation to form a solid bead body.

The two halves 106 and 108 need not be symmetrically formed. This is illustrated in Figures 12 and 13, in which only one 101 of the two halves of the bead has a groove 107 for accommodating the element. In Fig. 12 the separating line 109 is on the mid-plane of the bead. In Fig. 13 the separating line 109 has been moved to one side of the mid-plane, so that the groove 107 for receiving the element provided in the half 101 can be arranged symmetrically with respect to the mid-plane of the assembled bead.

A particularly reliable centering is provided by the constructions shown in Figs. 14 to 17. The arrangement of the hollow space 107 is as is illustrated in Figs. 11 to 13. The solid bead body is not, however, divided into two halves by a cut on the mid-plane. On the contrary, the characteristic feature of this form of construction is that the part 110 of the bead is so formed that the entire bore 112 of the bead is in this part. Thus, one solid part consists of a half sphere 110a and a hollow cylindrical projection 111, which jointly provide the bore 112. The recess 107 serves to accommodate the radioactive substance. To complete the bead, a solid portion 114 is pushed over the cylindrical portion 111. This form of construction has the advantage that the soldering or cementing of the two halves 110 and 114 becomes particulary easy to perform. Thus, to seal the active material off on the outside, it is sufficient to solder the halves together along the line 109 and along the circular joint 116. In contrast to the forms of construction shown in Figs. 11 to 13, these soldering points can be checked relatively easily since they are both located on the outside of the bead. If a close fit, for instance a tight or press fit, is chosen between the bore in the part 114 and the external diameter of the cylindrical projection 111, then, owing to the solid construction of the two parts of the bead, the part 114 can be drawn or shrunk so tightly on to the projection 111 of the part 110 that soldering is no longer necessary or is necessary only for safety's sake. It is also possible to provide the bore in the part 114 with an internal thread and the projection 111 with an external thread and to screw the parts 110 and 114 together, and, if necessary, to solder them together or connect them in some other way in addition.

Fig. 15 shows a bead which is constructed on the same principle as the bead illustrated in Fig. 14, except that the recess 107 for receiving the active substance is not provided in the part 110 having the cylindrical extension 111, but in the other solid part 114 of the ball.

It is of course possible to combine the arrangements shown in Figs. 14 and 15, as is shown in Fig. 15, i.e. arrange that the recess 107 for the active substance is located partly in one half 110 and partly in the other half 114.

A further modified form of the embodiments shown in Figs. 14, 15, and 16, is shown in Fig. 17, wherein the recess 107, in which the radioactive substance is accommodated, is formed in the cylindrical part 111. The bead illustrated in Fig. 18 is a further development of that shown in Fig. 17; it consists of a bored spherical body 119 into which is introduced a thollow cylindrical part 120 having a groove 107 carrying the active substance. This bead can be closed either by the cylindrical part 120 being soldered, screwed, shrunk, pressed and/or cemented into the spherical part 119 or otherwise secured therein or quite simply by soldering at the two circular separting lines 122 and 123.

According to Figs. 20 to 24, the bead body consists of the two parts 144 and 145. The part 145 adapted to be pushed into the part 144 is provided in Figure 20 with a shoulder 146 which positively defines the position of the part 145 in the part 144.

Figure 21:
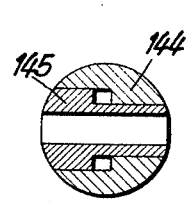

In the event of the hollow space 147 being completely filled with active substance in the form, for example, of a perforated disc having the cross-section of the space 147, this construction can be modified as shown in Fig. 21.

Figure 18:
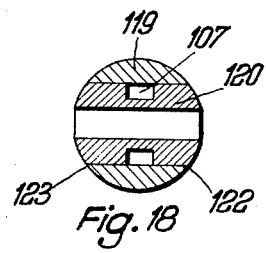
Figure 19:
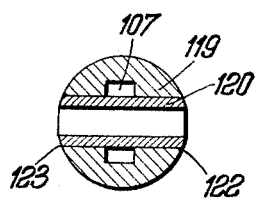
Fig. 19 shows a bead which is constructed similarly to that shown in Fig. 18, except that the cylindrical recess 107 is formed not in the cylindrical part but in the spherical part 119.
Figure 20:
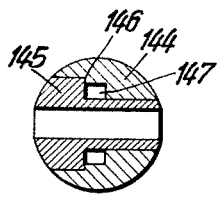
Fig. 20 shows a design from a bead which constitutes a modification, on the one hand, of the form of construction shown in Fig. 14, and on the other hand of that shown in Fig. 18.

The principle of Fig. 20, can, of course, be applied to all constructions in which, as in Figures 18 and 19, a part passing right through the body of the bead is provided.

Figure 22:
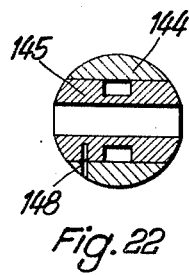

In Fig. 22 is shown a peg or pin 148 for securing together the inner and outer parts 145, 144. Such securing may also be affected in any other ways as by using a snap or spring ring.

Figure 23:
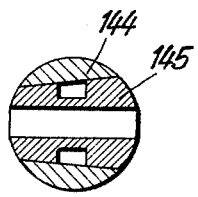
Figure 24:
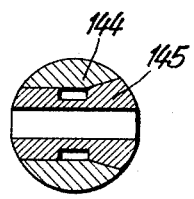

In Fig. 23, the position of the inner part is defined by means of conical surfaces on the two parts. In this case, structural modifications are possible; for example, as is shown in Fig. 24, the cone on the part 145 does not extend the whole length of the part but only half way, the remainder being cylindrical (see Fig. 24).

The invention is not limited to the use of specific radioactive substances. For example, cobalt 60, radium, radioactive cesium, iridium, or strontium, and other substances may be used. It is not essential for the radioactive substances to be applied in a specific form or shape.

We prefer to use thin filaments, since they readily allow accurate determination of any desired activity by taking a suitable length of such filament, winding said length, and then inserting it in the receiving groove. The applicators according to the invention may, however, be also employed for radioactive material which is available in plastic, granular or some other unshaped state. This material is then charged in the desired quantity into the receiving spaces provided therefor.

Figure 1:
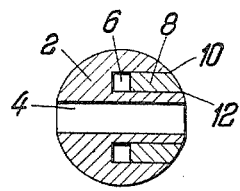
Figure 2:
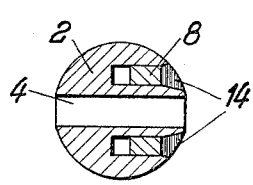
Figure 3:
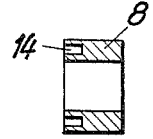
Figure 4:
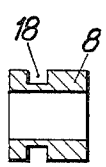
Figure 5:
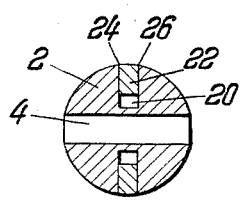
Figure 6:
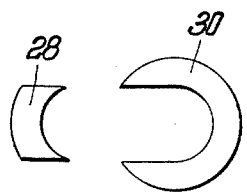
Figure 7:
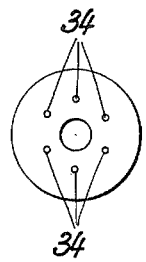
Figure 8:
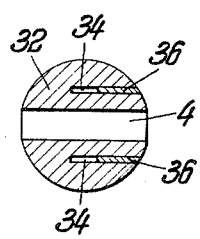
Figure 8:
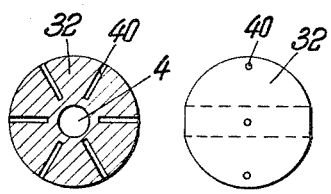
Figure 16:
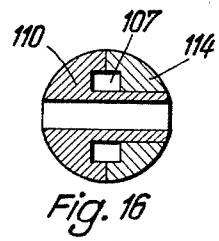
Figure 17:
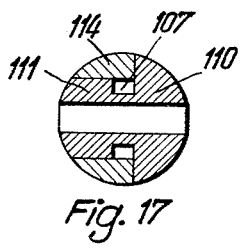

When granular, pasty, or similar radioactive preparations are employed, the occlusion of air should be prevented as far as possible, as already stated above in connection with the description of Fig. 5. To this end, the radioactive substance is preferably compressed and this compression can be carried out in a vacuum to prevent the occulation of air in excessive amounts.

The body of the bead may be made of any material suitable for contact with the human body, such as synthetic resins, ceramic materials, and metals or alloys, particularly ferromagnetic metals and alloys which allow remote control of the positioning of the beads. If the beads are to be applied inside the human body, we prefer to use beads made wholly or partially of gold or a metal of the platinum group, or of alloys of said metals. Gold, platinum, and their alloys filter part of the softer radiation, which is, in many cases, of advantage. In addition, said metals are readily soldered, and ensure a complete sealing of the radioactive material.

It will be understood that the invention is not limited to the details described, but that changes and modifications may be made without departing from the spirit and scope of the invention as defined in the appended claims.

We claim:

1. A radiation applicator comprising a solid bead of non-radiating material, said bead being provided with a central bore and at least one recess, a radioactive substance in said recess, and means sealing said substance in said recess, the outer surface of said sealing means being flush with the periphery of the bead.

2. A radiation applicator as defined in claim 1, wherein said bead is made of a member of the group consisting of gold, metals of the platinum group, and alloys thereof.

3. A radiation applicator comprising a solid bead of non-radiating material provided with a central axial bore, said bead being composed of at least two sections, an annular groove in at least one of said sections, said groove being closed by said other section when said sections are assembled to form said bead, and a radioactive substance in said groove.

4. A radiation applicator comprising a substantially spherical bead of non-radiating material, an axial bore in said bead, an annular groove concentric with said bore, a radioactive substance in said groove, and means sealing said groove, the outer surface of said sealing means being flush with the periphery of the bead.

5. A radiation applicator as defined in claim 4, wherein said groove extends radially from the periphery of the bead inwardly.

6. A radiation applicator as defined in claim 5, wherein said groove is closed by an annular sealing member.

7. A radiation applicator as defined in claim 6, wherein said sealing member is composed of two sections lying flush with the periphery of the bead and firmly bonded thereto.

8. A radiation applicator as defined in claim 6, wherein said sealing member is inwardly provided with a groove receiving said radioactive substance.

9. A radiation applicator as defined in claim 4, wherein said radioactive substance is a length of radioactive filament.

10. A radiation applicator as defined in claim 4, wherein said groove extends coaxially with said bore inwardly from the periphery of the bead.

11. A radiation applicator as defined in claim 4, comprising a sealing member within said groove and a bonding material filling the outer part of the groove flush with the periphery of the bead.

12. A radiation applicator comprising a solid bead of a non-radiating metal, said bead being provided with an axial bore and an equatorial groove, a $Co_{60}$ containing filament in said groove, and an annular ring in said groove soldered flush with the periphery of the bead and sealing said filament in said groove.

13. A radiation applicator comprising a solid bead of non-radiating material, said bead provided with a central bore extending therethrough to receive a string, and with additional bores arranged coaxially with said central bore and ending inside said bead to receive a radioactive material, and stoppers closing said additional bores flush with the periphery of the bead.

14. A radiation applicator as claimed in claim 3 wherein said groove starts from a plane perpendicular to the axis of the central bore.

References Cited in the file of this patent

UNITED STATES PATENTS

| | | |
|---|---|---|
| 1,565,490 | Muguet | Dec. 15, 1925 |
| 1,817,329 | Wichmann | Aug. 4, 1931 |

FOREIGN PATENTS

| | | |
|---|---|---|
| 281,869 | Germany | Feb. 3, 1915 |
| 139,243 | Austria | Oct. 25, 1934 |